US011312486B2

(12) United States Patent
Regev

(10) Patent No.: US 11,312,486 B2
(45) Date of Patent: Apr. 26, 2022

(54) PROPULSION SYSTEM

(71) Applicant: ISRAEL AEROSPACE INDUSTRIES LTD., Lod (IL)

(72) Inventor: Eyal Regev, Mazkeret Batya (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 403 days.

(21) Appl. No.: 15/329,848

(22) PCT Filed: Jul. 28, 2015

(86) PCT No.: PCT/IL2015/050775
§ 371 (c)(1),
(2) Date: Jan. 27, 2017

(87) PCT Pub. No.: WO2016/016889
PCT Pub. Date: Feb. 4, 2016

(65) Prior Publication Data
US 2017/0240274 A1 Aug. 24, 2017

(30) Foreign Application Priority Data
Jul. 31, 2014 (IL) .......................... 233902

(51) Int. Cl.
B64C 29/00 (2006.01)
F02B 61/04 (2006.01)
(Continued)

(52) U.S. Cl.
CPC .......... B64C 29/0033 (2013.01); B64C 27/28 (2013.01); B64C 39/024 (2013.01);
(Continued)

(58) Field of Classification Search
CPC .......... B64D 35/00–08; B64C 29/0033; B64C 27/24; B64C 27/28
See application file for complete search history.

(56) References Cited

U.S. PATENT DOCUMENTS 1,019,635 A 3/1912 Harlow
2,814,451 A 11/1957 Turner et al.
(Continued)

FOREIGN PATENT DOCUMENTS

EP 0 093 937 A1 11/1983
GB 2 376 928 A 12/2002
(Continued)

OTHER PUBLICATIONS

"US Special Ops Wants Hybrid Small UAS", Aviation Week, Nov. 24, 2010, 1 page.

Primary Examiner — Justin M Benedik
(74) Attorney, Agent, or Firm — Vorys, Sater, Seymour & Pease LLP; William Klima

(57) ABSTRACT

Provided is a propulsion system, including a first propulsion unit, a second propulsion unit, a rotor, a first coupling and a second coupling. The first propulsion unit is configured for being fixedly mounted to an airframe. The rotor is configured for being pivotably mounted with respect to the first propulsion unit to allow selectively pivoting of the rotor from a horizontal mode to a vertical mode. The first coupling is configured for selectively coupling and decoupling the rotor with respect to the first propulsion unit. The second coupling is configured for selectively coupling and decoupling the rotor with respect to the second propulsion unit, independently of the first coupling.

22 Claims, 7 Drawing Sheets

(51) Int. Cl.
  *F02B 73/00* (2006.01)
  *B64C 27/28* (2006.01)
  *B64D 35/08* (2006.01)
  *B64C 39/02* (2006.01)
  *B64D 27/24* (2006.01)
  *B64D 35/02* (2006.01)
  *B64D 27/02* (2006.01)

(52) U.S. Cl.
  CPC ............. *B64D 27/24* (2013.01); *B64D 35/02* (2013.01); *B64D 35/08* (2013.01); *F02B 61/04* (2013.01); *F02B 73/00* (2013.01); *B64C 2201/042* (2013.01); *B64C 2201/104* (2013.01); *B64C 2201/108* (2013.01); *B64D 2027/026* (2013.01); *Y02T 50/60* (2013.01)

(56) References Cited

U.S. PATENT DOCUMENTS

| | | | |
|---|---|---|---|
| 3,089,666 A * | 5/1963 | Quenzler | B64C 29/0033 244/7 R |
| 3,179,354 A | 4/1965 | Alvarez-Calderon | |
| 3,592,412 A * | 7/1971 | Glatfelter | B64C 29/0033 244/7 A |
| 3,722,830 A * | 3/1973 | Barber | B64C 19/00 244/17.23 |
| 4,880,071 A * | 11/1989 | Tracy | B64C 29/0033 180/117 |
| 5,449,129 A | 9/1995 | Carlile et al. | |
| 8,317,126 B2 | 11/2012 | Harris et al. | |
| 8,469,306 B2 * | 6/2013 | Kuhn, Jr. | B64C 29/0033 244/12.4 |
| 8,543,262 B1 | 9/2013 | Gehrke et al. | |
| 8,602,347 B2 * | 12/2013 | Isaac | B64C 29/0033 244/23 B |
| 8,640,439 B2 | 2/2014 | Hoffjann et al. | |
| 2005/0284676 A1 | 12/2005 | King et al. | |
| 2006/0192046 A1 | 8/2006 | Heath et al. | |
| 2007/0057113 A1 | 3/2007 | Parks | |
| 2008/0184906 A1 | 8/2008 | Kejha | |
| 2009/0145998 A1 | 6/2009 | Salyer | |
| 2010/0072318 A1 | 3/2010 | Westenberger | |
| 2011/0108663 A1 | 5/2011 | Westenberger | |
| 2012/0056040 A1 | 3/2012 | Brotherton-Ratcliffe et al. | |
| 2012/0091257 A1 | 4/2012 | Wolff et al. | |
| 2012/0209456 A1 | 8/2012 | Harmon et al. | |
| 2012/0234968 A1 | 9/2012 | Smith | |
| 2013/0134264 A1 | 5/2013 | Carter, Jr. et al. | |
| 2013/0147204 A1 | 6/2013 | Botti et al. | |
| 2014/0091172 A1 * | 4/2014 | Arlton | B64C 7/00 244/17.23 |
| 2015/0151844 A1 * | 6/2015 | Anton | B64C 31/024 244/55 |
| 2015/0285165 A1 | 10/2015 | Steinwandel et al. | |

FOREIGN PATENT DOCUMENTS

| | | |
|---|---|---|
| WO | 2006/092625 A1 | 9/2006 |
| WO | 2010/123601 A1 | 10/2010 |
| WO | 2010/137016 A2 | 12/2010 |
| WO | 2013/186009 A1 | 12/2013 |

* cited by examiner

PROPULSION SYSTEM

TECHNOLOGICAL FIELD

The presently disclosed subject matter relates to propulsion systems, in particular to propulsion systems for air vehicles, in particular for VTOL type air vehicles.

BACKGROUND ART

References considered to be relevant as background to the presently disclosed subject matter are listed below:
U.S. Pat. No. 8,317,126
U.S. Pat. No. 8,543,262
U.S. Pat. No. 8,640,439
US 2005/284676
US 2007/057113
US 2008/184906
US 2009/145998
US 2012/056040
US 2012/209456
US 2013/134264
US 2013/147204
GB 2,376,928
WO 2010/123601
WO 2013/186009
"US Special Ops Wants Hybrid Small UAS", Aviation Week, 24 Nov. 2010

Acknowledgement of the above references herein is not to be inferred as meaning that these are in any way relevant to the patentability of the presently disclosed subject matter.

BACKGROUND

There are at least four main categories of VTOL or V/STOL vehicles: where the vehicle has a single propulsion unit adapted for producing vertical as well as horizontal thrust; where the vehicle has separate propulsion units for producing vertical and horizontal thrust; where the vehicle has a propulsion unit for vertical and horizontal thrust, plus a supplemental propulsion unit for vertical thrust; other configurations.

For air vehicles in the vertical take-off and landing (VTOL) category, the power requirements for vectored flight, including vertical take-off (VTO), vertical landing (VL) and hover, are much higher, for example seven times higher, than the power requirements for aerodynamic flight.

General Description

According to a first aspect of the presently disclosed subject matter there is provided a propulsion system comprising:
a first propulsion unit configured for being fixedly mounted to an airframe;
a second propulsion unit;
a rotor configured for being pivotably mounted with respect to the first propulsion unit to allow selectively pivoting of the rotor from a horizontal mode to a vertical mode;
a first coupling for selectively coupling and decoupling the rotor with respect to the first propulsion unit;
a second coupling for selectively coupling and decoupling the rotor with respect to the second propulsion unit, independently of the first coupling.

For example, the rotor configured for being pivotably mounted to the airframe to allow said selectively pivoting of the rotor from a horizontal mode to a vertical mode.

For example, said first propulsion unit comprises an internal combustion engine.

For example, said second propulsion unit comprises an electric motor.

For example, said second propulsion unit is configured to pivot together with said rotor. For example, the second propulsion unit is mounted to the rotor, such that irrespective of whether the second propulsion unit is coupled or decoupled from the rotor, the second propulsion unit selectively pivots with the rotor as a unit, between the horizontal mode and the vertical mode.

In at least some examples optionally including the above examples: in vertical mode the rotational axis of the rotor is nominally vertical (i.e., either vertical, or within ±5° of vertical, or within ±10° of vertical, or within ±15° of vertical, or within ±20° of vertical; in horizontal mode the rotational axis of the rotor is nominally horizontal (i.e., either horizontal, or within ±5° of horizontal, or within ±10° of horizontal, or within ±15° of horizontal, or within ±20° of horizontal.

For example, said first propulsion unit is reversibly coupled to a first longitudinal side of the rotor, and wherein said second propulsion unit is reversibly coupled to a second longitudinal side of the rotor.

For example, said rotor comprises any one of: one or more propellers; one or more ducted fans; one or more unducted fans.

For example, said first propulsion unit has a first power rating and wherein said second propulsion unit has a second power rating. For example, said first power rating is within ±10% of said second power rating. For example, a power rating ratio between said first power rating and said second power rating is between 0.1 and 10. For example, said power rating ratio is 1.0.

For example, the first propulsion unit is reversibly coupled to the rotor via a first driveshaft. For example, said first driveshaft comprises a first portion driven by the first propulsion unit and a second portion for driving the rotor when the first driveshaft is coupled to the rotor via the first coupling, wherein in said vertical mode said first portion is at a first angular disposition with respect to said second portion, wherein in said horizontal mode said first portion is at a second angular disposition with respect to said second portion, and wherein said first angular disposition is less than said second angular disposition. For example, said first angular disposition is about 90° in pitch, and wherein said second angular disposition is about 180° in pitch.

In one example, said first driveshaft comprises a universal joint arrangement to allow said first portion and said second portion to pivot between said first angular disposition and said second angular disposition while concurrently remaining operatively connected to one another to allow torque to be transmitted between said first portion and said second portion. For example, the propulsion system further comprises a shroud member configured for covering the first driveshaft in any angular disposition between said first angular disposition and said second angular disposition. For example, said shroud member comprises a rigid tubular first shroud portion for covering said first portion, a rigid tubular second shroud portion for covering said second portion, and a flexible tubular shroud joint portion for covering the universal joint arrangement, wherein the first shroud portion, the second shroud portion and said shroud joint portion are contiguous. In another example, said first driveshaft comprises a disconnection arrangement to allow said first portion and said second portion to pivot between said first angular disposition in which said first portion is disconnected with respect to said second portion at said disconnection portion, and said second angular disposition in which said first portion is connected with respect to said second portion at said disconnection portion to thereby allow torque to be transmitted between said first portion and said second portion. For example, said disconnection arrangement comprises a first connector portion provided in said first portion and a second connector portion provided in said second portion, wherein the first connector portion frictionally engages and locks with the second connector portion in the second angular disposition.

For example, said first coupling comprises a first electrical clutch configured for selectively engaging and disengaging the first propulsion unit with respect to the rotor.

For example, the second propulsion unit is reversibly coupled to the rotor via a second driveshaft.

For example, said second coupling comprises a second electrical clutch configured for selectively engaging and disengaging the second propulsion unit with respect to the rotor.

For example, the rotor is rotatably mounted to a support bracket, the support bracket being pivotable between the horizontal mode and the vertical mode.

For example, said second propulsion unit is configured for selectively generating electrical power when driven by any one of:
 (a) said first propulsion unit;
 (b) said rotor, which is in wind milling mode and in turn is aerodynamically driven by an airflow.

According to a second aspect of the presently disclosed subject matter there is provided an air vehicle comprising at least one propulsion system as defined according to the first aspect of the presently disclosed subject matter.

For example, the air vehicle further comprises at least one battery operatively connected to the second propulsion unit.

For example, the air vehicle comprises one said propulsion system and two tiltable vectored thrust propulsion units tiltable at least between respective horizontal mode and vertical mode, wherein said propulsion system and said two vectored thrust propulsion units are in triangle configuration.

In one example, said propulsion system is aft mounted along a longitudinal axis of the air vehicle, and said two vectored thrust propulsion units are forward mounted, each said vectored thrust propulsion unit laterally spaced from the longitudinal axis in opposed directions.

In another example, said propulsion system is forward mounted along a longitudinal axis of the air vehicle, and said two vectored thrust propulsion units are aft mounted, each said vectored thrust propulsion unit laterally spaced from the longitudinal axis in opposed directions.

For example, the air vehicle is configured as a manned air vehicle; alternatively, the air vehicle is configured as an unmanned air vehicle (UAV).

According to a third aspect of the presently disclosed subject matter there is provided a method for operating an air vehicle, comprising:
 providing the air vehicle as defined an air vehicle as defined according to the second aspect of the presently disclosed subject matter;
 operating the air vehicle in one or more of vertical configuration and horizontal configuration, wherein in vertical configuration said rotor is in vertical mode, and wherein in horizontal configuration said rotor is in horizontal mode.

For example, the method comprises setting said rotor in horizontal mode, decoupling said rotor from said first propulsion unit and coupling said rotor to said second propulsion unit.

For example, the method is for use in one or more of:
 enabling the second propulsion unit to exclusively provide propulsion for the air vehicle in aerodynamic flight;
 enabling the air vehicle to cruise unpowered to provide silent gliding;
 enabling the air vehicle to cruise unpowered and using the airflow over the rotor to drive the second propulsion unit to thereby generate electrical power.

For example, the method comprises setting said rotor in vertical mode, decoupling said rotor from said first propulsion unit and coupling said rotor to said second propulsion unit. For example, the method is for use in enabling the at least one propulsion unit to provide vertical propulsion exclusively from the second propulsion unit thereby providing low-noise VTOL operations.

For example, the method comprises setting said rotor in horizontal mode, coupling said rotor to said first propulsion unit and decoupling said rotor to said second propulsion unit. For example, the method is for use in enabling the first propulsion unit to exclusively provide propulsion for the air vehicle in aerodynamic flight.

For example, the method comprises setting said rotor in vertical mode, coupling said rotor to said first propulsion unit and decoupling said rotor to said second propulsion unit. For example, the method is for use in enabling the at least one propulsion unit to provide vertical propulsion exclusively from the first propulsion unit thereby providing low-noise VTOL operations.

For example, the method comprises setting said rotor in horizontal mode, coupling said rotor to said first propulsion unit and coupling said rotor to said second propulsion unit. For example, the method is for use in one or more of:
 enabling the first propulsion unit and the second propulsion unit to provide augmented propulsion for the air vehicle in any one of: conventional take-off; conventional landing; aerodynamic flight;
 enabling the first propulsion unit to exclusively provide propulsion for the air vehicle and using the first propulsion unit to drive the second propulsion unit to thereby generate electrical power.

For example, the method comprises setting said rotor in vertical mode, coupling said rotor to said first propulsion unit and coupling said rotor to said second propulsion unit. For example, the method is for use in enabling the first propulsion unit and the second propulsion unit to provide augmented vertical propulsion for the air vehicle thereby providing augmented VTOL operations.

A feature of at least one example of the presently disclosed subject matter is that the additional the power requirements for vectored flight is provided by an additional propulsion unit that is electrically powered via a battery.

A feature of at least one example of the presently disclosed subject matter is that the first propulsion unit in the form of an internal combustion engine nominally provides power for aerodynamic flight including cruise. At the same time, the second propulsion unit, in the form of an electrical motor and being less efficient in cruise, can be disengaged from the rotor during cruise, which can reduce power loss which could otherwise result associated with heat generated by the electric motor, and which could otherwise have a negative effect on the performance of the air vehicle.

A feature of at least one example of the presently disclosed subject matter is that by enabling selective coupling and decoupling each one of the first propulsion unit and the second propulsion unit (independently from one another) with respect to the rotor, thrust for vectored flight can be provided by the battery-powered electric motor, while thrust for aerodynamic flight is provided by the internal combustion engine. At the same time, the same rotor can be used for vectored flight and for aerodynamic flight, in at least some cases reducing weight requirements and/or difficult design constraints which would otherwise be required, for example.

A feature of at least one example of the presently disclosed subject matter is that providing a single pivotable rotor selectively coupled/decoupled with respect to each one of the first propulsion unit and the second propulsion unit can provide significantly greater range or endurance and weight saving as compared with a conventional serial hybrid propulsion system in which the internal combustion engine is connected to an alternator for generating electrical energy to an electric motor that drives a rotor.

A feature of at least one example of the presently disclosed subject matter is that providing a single pivotable rotor selectively coupled/decoupled with respect to each one of the first propulsion unit and the second propulsion unit provides thrust redundancy and high energy efficiency, and provides improved performance and weight saving as compared with a conventional serial hybrid propulsion system in which the internal combustion engine is connected to an alternator for generating electrical energy to an electric motor that drives a rotor.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1A:
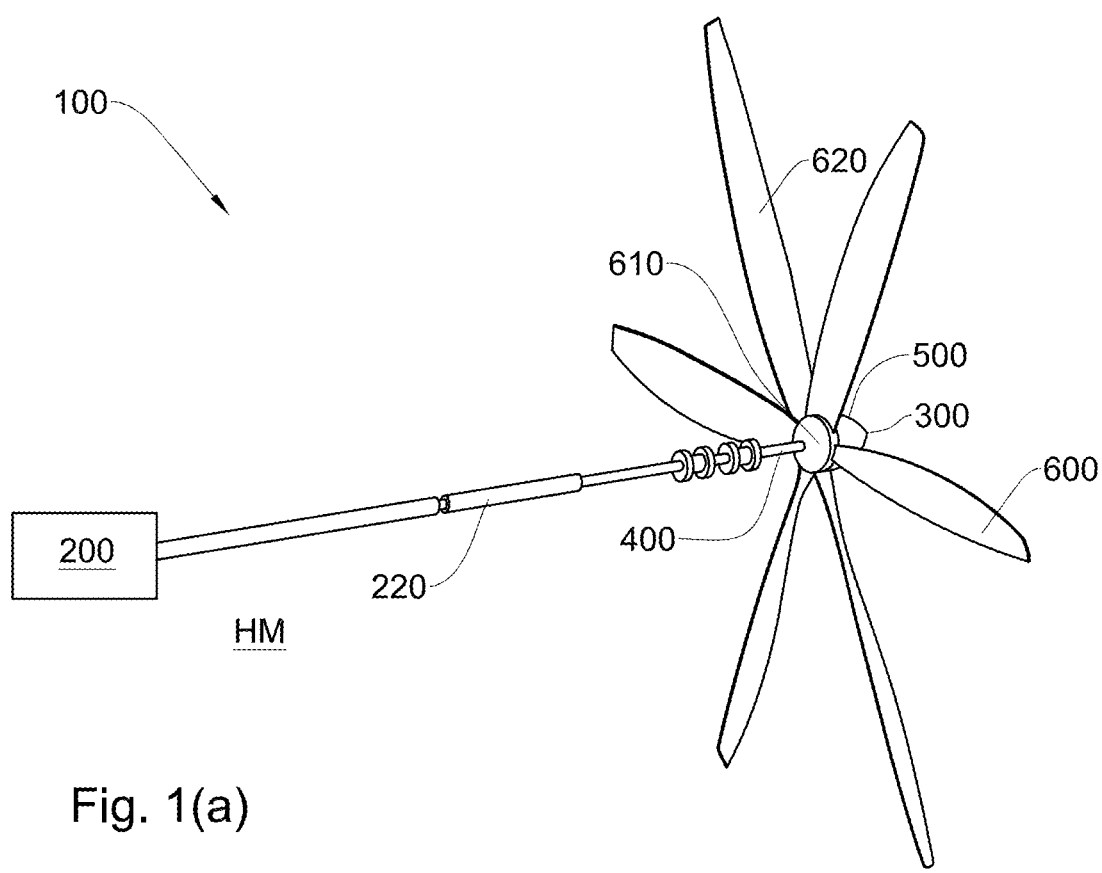
FIG. 1(a) schematically illustrates a propulsion system according to a first example of the presently disclosed subject matter, with the rotor in horizontal mode.

Referring to FIGS. 1(a) to 3(b), a propulsion system for an air vehicle 1 according to a first example of the presently disclosed subject matter, generally designated 100, comprises a first propulsion unit 200, a second propulsion unit 300, a first coupling 400, a second coupling 500, and a rotor 600.

Figure 1B:
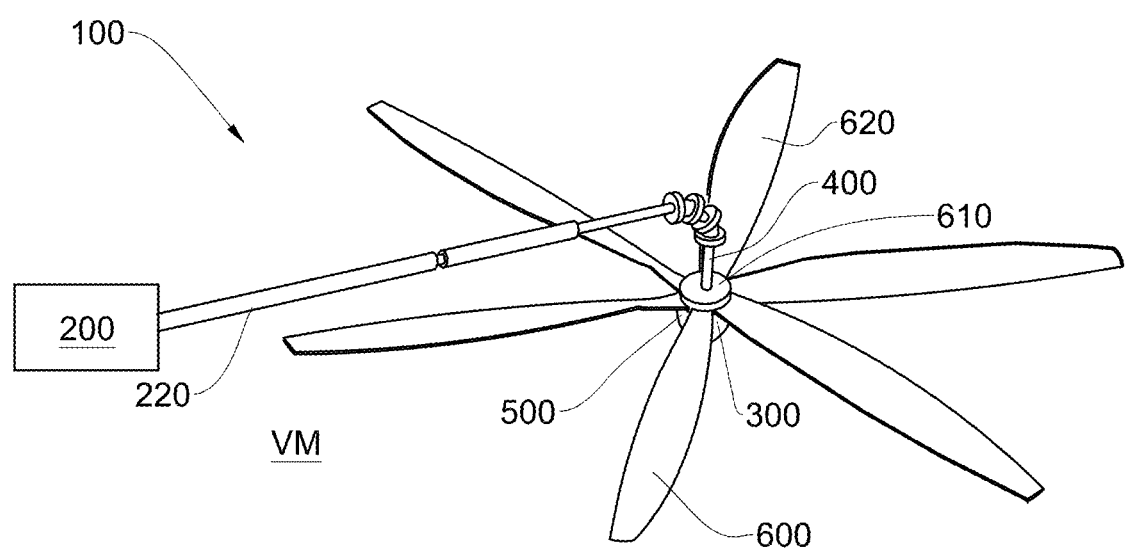
FIG. 1(b) shows the example of FIG. 1(a) with the rotor in vertical mode.
Figure 2A:
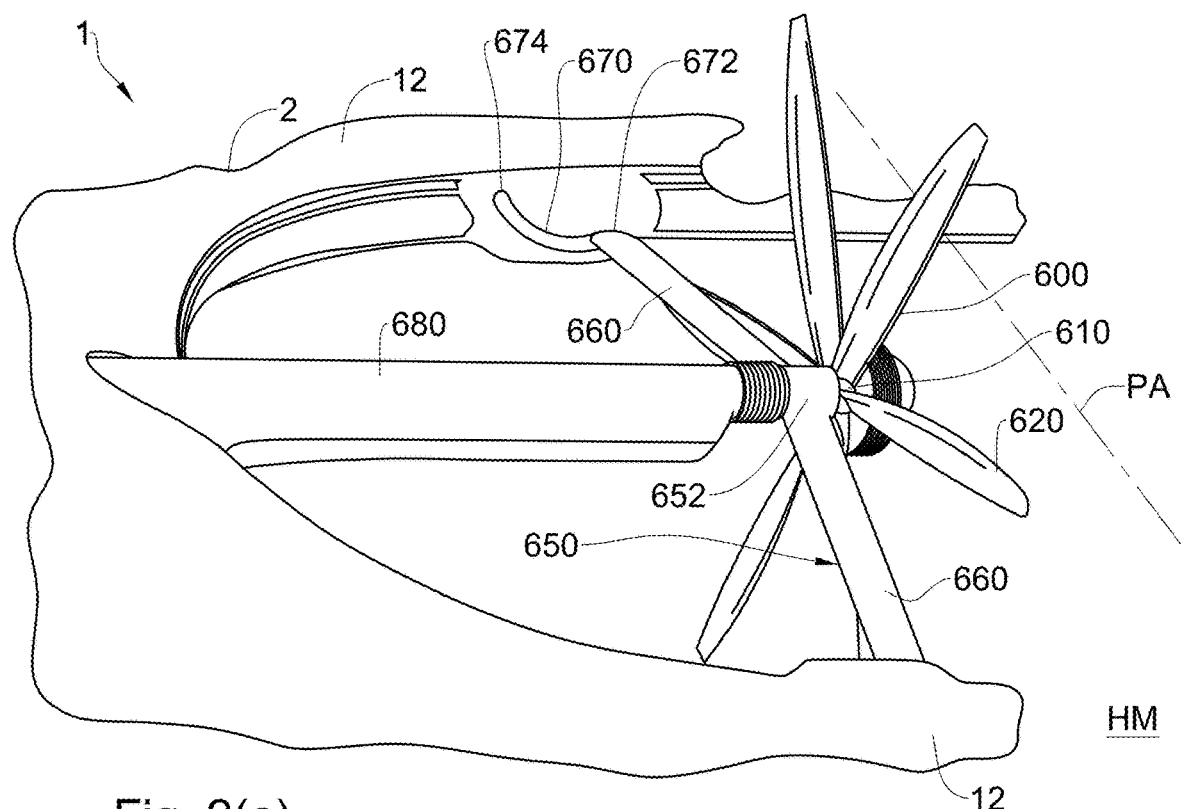
FIG. 2(a) illustrates in partially fragmented isometric view the example of FIG. 1(a) installed in an airframe of an air vehicle, with the rotor in horizontal mode.
Figure 2B:
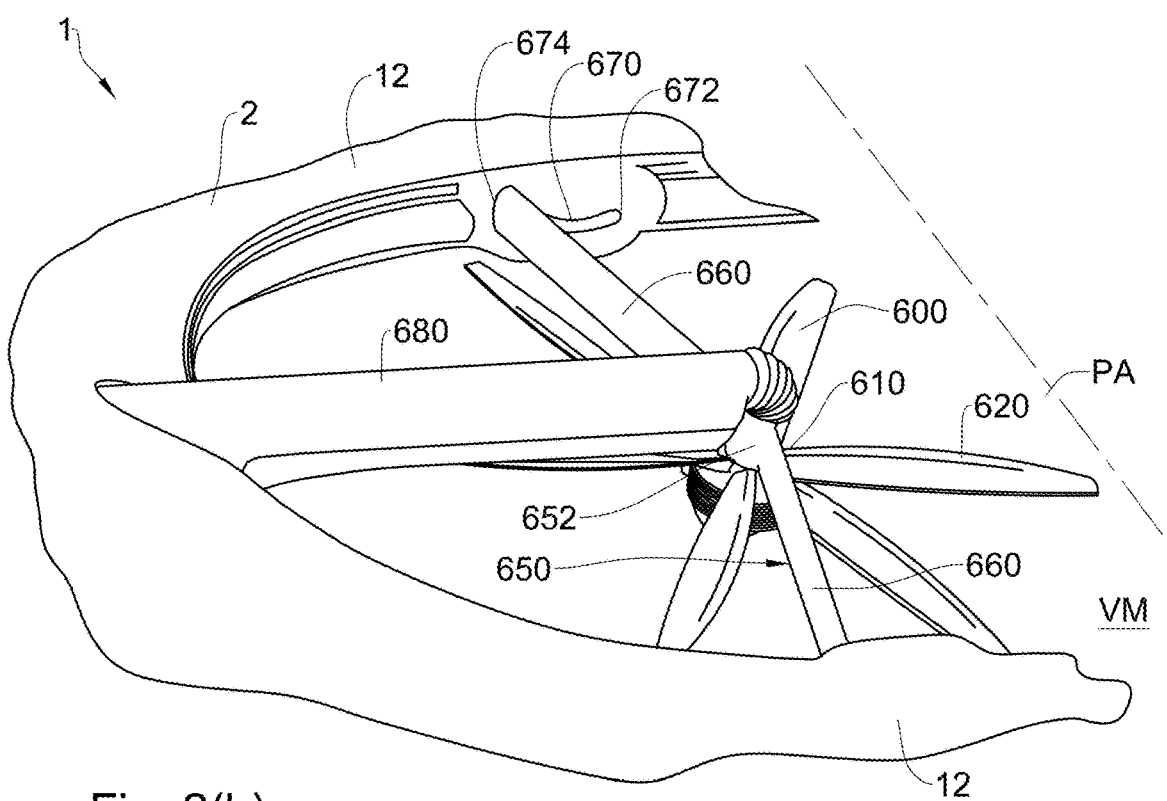
FIG. 2(b) shows in partially fragmented isometric view the example of FIG. 2(a) with the rotor in vertical mode.

As will become clearer herein, the first propulsion unit 200 is configured for being fixedly mounted to the airframe 2 of the air vehicle 1, while the rotor 600 is configured for being pivotably mounted with respect to the first propulsion unit 200 (and thus with respect to the air vehicle 1) to allow selective pivoting of the rotor 600 between a horizontal mode HM (FIGS. 1(a), 2(a)), in which the rotor 600 can generate horizontal thrust, and a vertical mode VM (FIGS. 1(b), 2(b)), in which the rotor 600 can generate vertical thrust. As will also become clearer herein, the first coupling 400 is configured for selectively coupling or decoupling the rotor 600 with respect to the first propulsion unit 200, while the second coupling 500 is configured for selectively coupling or decoupling the rotor 600 with respect to the second propulsion unit 300, wherein the coupling/decoupling operation of the first coupling 400 is independent of the coupling/decoupling operation of the second coupling 500.

In this example, the first propulsion unit 200 comprises an internal combustion engine, and is configured for developing shaft power. The internal combustion engine in this example can be a piston engine or gas turbine engine, or any other type of liquid fuel or gas-fueled engine configured for generating shaft power, for example. While in this example the first propulsion unit has a first power rating P1 of (i.e., generates nominal maximum power at) about 500 kW, in alternative variations of this example the first propulsion unit 200 can be rated for generating different power levels, for example greater than or less than 500 kW. In this example, the first power rating is sufficient to provide at least one of vertical take-off (VTO) capability or vertical landing (VL) capability to the air vehicle 1, together with additional vectored thrust (VT) propulsion units provided in the air vehicle, as will become clearer herein.

In this example, the second propulsion unit 300 comprises an electric motor, powered by a suitable battery 301, which can be accommodated in the airframe 2, for example. While in this example the second propulsion unit 300 has a second power rating P2 of (i.e., generates nominal maximum power at) about 500 kW, in alternative variations of this example the second propulsion unit 300 can be rated for generating different power levels, for example greater than or less than 500 kW. In this example, the second power rating P2 is also sufficient by itself to provide at least one of VTO capability or VL capability to the air vehicle 1, together with the additional VT propulsion units provided in the air vehicle, as will become clearer herein.

In this example, the ratio R of the first power rating P1 to the second power rating P2 is about 1.0, ±0 to 10% of the second power rating P2. However, in alternative variations of this example ratio R can be any valued between 0.1 and 10, for example, depending on other factors.

In this example, the first propulsion unit 200 is reversibly coupled (via the first coupler 300) to a first longitudinal side of the rotor 600, and the second propulsion unit 300 is reversibly coupled (via the second coupler 400) to the (opposed-facing) second longitudinal side of the rotor 600. Thus, in horizontal mode HM, the first propulsion unit 200 is reversibly coupled to a forward facing side of the rotor 600, while the second propulsion unit 300 is reversibly coupled to the aft facing side of the rotor 600.

In this example, the second propulsion unit 300 is mounted to the rotor 600 (in particular to second longitudinal side of the rotor 600), and thus the second propulsion unit 300 pivots together with the rotor 600 between the horizontal mode HM and the vertical mode VM.

A first driveshaft 220 is provided for turning the rotor 600 when engaged thereto via the first coupling 400, and thus is configured to transmit the shaft power generated by the first propulsion unit 200 to the rotor 600, when coupled thereto. Thus, the first propulsion unit 200 is reversibly coupled to the rotor 600 via the first driveshaft 220 and first coupler 400.

A second driveshaft 320 directly turns the rotor 600 when engaged thereto via the second coupling 500. Thus, the second propulsion unit 300 is reversibly coupled to the rotor 600 via the second driveshaft 320 and second coupler 500. In this example, the second coupler 500 is axially located between the rotor 600 and the second propulsion unit 300.

In this example, the first coupling 400 comprises an electrically controlled clutch enabling the first prolusion unit 200 to be selectively engaged or disengaged with respect to the rotor 600 responsive to electrical, electronic or digital commands received from a controller (not shown). Similarly, in this example, the second coupling 500 comprises another electrically controlled clutch enabling the second prolusion unit 300 to be selectively engaged or disengaged with respect to the rotor 600 (independently of operation of the first coupler 400) responsive to electrical, electronic or digital commands received from the controller. There are many commercially available electrical clutches that can be used directly or adapted for use as the first coupling 400 or as the second coupling 500.

Figure 3A:
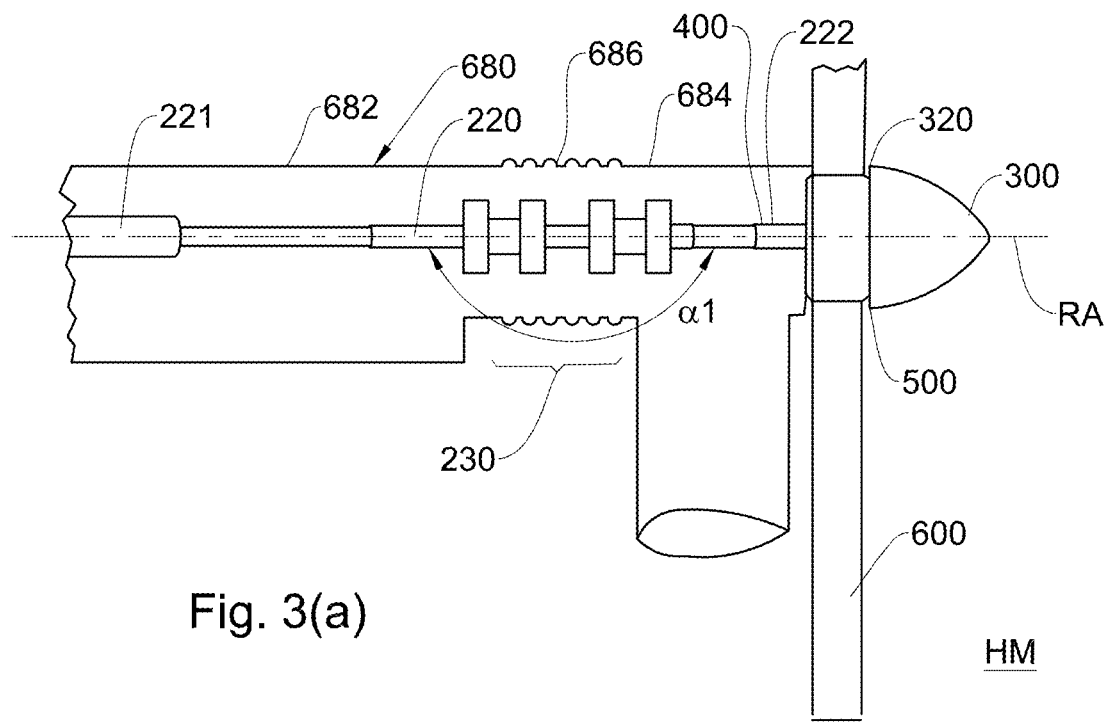
FIG. 3(a) illustrates in partially fragmented side view the example of FIG. 2(a), with the rotor in horizontal mode.
Figure 3B:
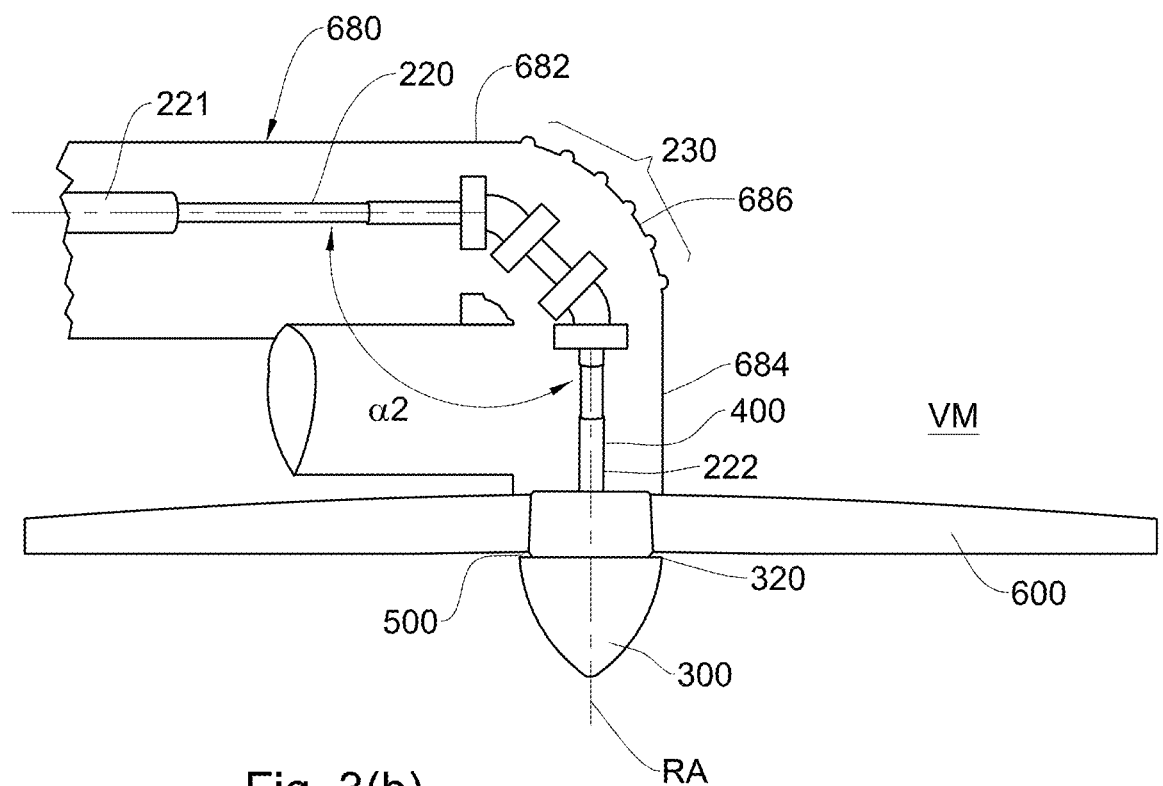
FIG. 3(b) shows in partially fragmented side view the example of FIG. 3(a) with the rotor in vertical mode.

Referring in particular to FIGS. 3(a) and 3(b), the first driveshaft 220 comprises a propulsion unit end portion 221 connected to and driven by the first propulsion unit 200, a rotor end portion 222 connected to and for driving the rotor 600, and a universal joint arrangement 230 connecting together the propulsion unit end portion 221 and the rotor end portion 222. While in this example, the first coupling 400 is located in the rotor end portion 222, in alternative variations of this example the first coupling 400 is located in the propulsion unit end portion 221.

The rotor 600 comprises any suitable arrangement having aerodynamic elements that collectively and aerodynamically generate a thrust force in response to a torque being applied to the rotor, the torque being provided by the shaft power generated by the first propulsion unit 200 and/or the second propulsion unit 300, depending on the specific mode of operation, as will become clearer herein. The torque is provided about a rotor axis RA about which the rotor 600 rotates responsive to the torque to provide the aforementioned thrust. In at least this and other examples: in vertical mode the rotational axis RA of the rotor is nominally vertical (i.e., either vertical, or within ±5° of vertical, or within ±10° of vertical, or within ±15° of vertical, or within ±20° of vertical; in horizontal mode the rotational axis RA of the rotor 600 is nominally horizontal (i.e., either horizontal, or within ±5° of horizontal, or within ±10° of horizontal, or within ±15° of horizontal, or within ±20° of horizontal.

In this example, and referring to FIGS. 2(a) and 2(b) in particular, the rotor 600 is in the form of a single stage pusher propeller, comprising a hub 610 and six blades 620 radially projecting therefrom. The rotor end portion 222 of the first driveshaft 220 is thus operatively connected to the hub 610. In alternative variations of this example, the rotor 600 can have more than six blades or fewer than six blades, and/or can include a plurality of stages (at least some of which can be co-rotating or counter-rotating), and/or can be configured as a puller propeller arrangement, and/or can comprise a ducted fan, and/or can comprise an unducted fan, for example.

Referring again to FIGS. 2(a) and 2(b), the rotor 600 is rotatably mounted to a support bracket 650, comprising a bearing ring 652 onto which the hub 610 is rotatably mounted, and two support arms 660 rigidly connected to the hub 610 at an inner end 662 thereof and radially projecting therefrom. The outer ends 664 of the arms 660 are engaged in a respective curvuate slot 670 provided in twin spaced booms 12 in the airframe 2, on either lateral side of the propulsion system 100. Each curvuate slot 670 has a uniform curvature having a center of rotation located on a pivot axis PA that is parallel to the pitch axis x of the air vehicle 1. Each curvuate slot 670 also has a first mechanical stop 672 and a second mechanical stop 674, allowing the outer end 664 of the respective arm 660 to move in the slot between the two mechanical stops, while concurrently the rotor 600 and support bracket 650 correspondingly pivot in pitch about the pivot axis PA. Thus, when the outer ends 664 are abutting the first mechanical stop 672 (see FIG. 2(a)) the rotor 600 is in horizontal mode HM, and when the outer ends 664 are abutting the second mechanical stop 674 (see FIG. 2(a)) the rotor 600 is in vertical mode VM. A suitable actuator (not shown) is operatively connected to at least one of the outer ends 664 and selectively moves the outer ends 664 in the respective slots 670, thereby selectively pivoting rotor 600 about the pivot axis PA between the horizontal mode HM and the vertical mode VM. Additionally, in this example, the actuator can be operated to provide and maintain any desired pivot angle intermediate between the horizontal mode HM and the vertical mode VM, for example to provide a particular corresponding thrust vector intermediate between horizontal thrust and vertical thrust.

Thus, correspondingly, in the vertical mode VM the propulsion unit end portion 221 is at a first angular disposition $\alpha 1$ (in particular, in pitch) with respect to the rotor end portion 222, whereas in the horizontal mode HM, the propulsion unit end portion 221 is at a second angular disposition $\alpha 2$ (in particular, in pitch) with respect to the rotor end portion 222 (see FIGS. 3(a) and 3(b) in particular). In this example, the first angular disposition $\alpha 1$ is about 90° in pitch (i.e., the propulsion unit end portion 221 is orthogonal to the rotor end portion 222), and the second angular disposition $\alpha 2$ is 180° in pitch (i.e., the propulsion unit end portion 221 is co-axial to the rotor end portion 222), and thus the first angular disposition $\alpha 1$ is less than the second angular disposition $\alpha 2$. Furthermore, in this example, the propulsion unit end portion 221 is parallel to the longitudinal axis of the air vehicle 1. However, in alternative variations of this example, the propulsion unit end portion 221 is at a pitch angle $\theta$ to the longitudinal axis of the air vehicle, and thus the first angular disposition $\alpha 1$ is different from 90°, and the second angular disposition $\alpha 2$ is different from 180°;

however, in at least some of these examples, the angular difference between the first angular disposition α1 and the second angular disposition α2 generally remains at 90°.

In this example, the universal joint arrangement 230 allows the propulsion unit end portion 221 and the rotor end portion 222 to pivot with respect to one another between the first angular disposition α1 and the second angular disposition α2, while concurrently remaining operatively connected to one another, thereby allowing torque to be transmitted between the propulsion unit end portion 221 and the rotor end portion 222 for the full range of angular dispositions between α1 and α2. Thus, when the first coupler 400 is in the respective coupled configuration, the first propulsion unit 200 transmits torque to the rotor 600 via the first driveshaft 220 for the full range of angular dispositions between α1 and α2, i.e., during hover, aerodynamic flight, and transitions in-between the two.

Optionally, the universal joint arrangement 230 is configured for varying the total length of the first driveshaft 220 between the vertical mode VM and horizontal mode HM of the rotor 600.

There are many commercially available universal joints that can be used directly or adapted for use as the universal joint arrangement 230. One such commercially available universal joint can include, in at least some examples, the Apex Cornay Universal Joint, provided by Apex Fasteners Inc, USA.

In this example, and referring again in particular to FIGS. 3(a) and 3(b), the propulsion system 100 further comprises a shroud member 680 covering the driveshaft 220. The shroud member 680 is configured for covering the driveshaft 220 for the full range of angular dispositions between α1 and α2, and comprises a rigid or semi rigid, tubular first shroud portion 682 covering at least part of the propulsion unit end portion 221 (i.e., that projects aft from a portion of the airframe 2), a rigid or semi rigid, tubular second shroud portion 684 covering the a rotor end portion 222, and a flexible tubular shroud joint portion 686 covering the universal joint arrangement 230. The first shroud portion 682, the second shroud portion 684 and the shroud joint portion 686 are contiguous. While in this example the shroud joint portion 686 has an accordion-type form including axially spaced ribs, allowing flexing between the first angular disposition α1 and the second angular disposition α2, in alternative variations of this example the shroud joint portion can have any other suitable form that allows such flexing to accommodate movement of the universal joint arrangement 230 between the vertical mode VM and the horizontal mode HM.

The propulsion system 100 has a number of operational modes, including at least the following rotor coupling modes, each rotor coupling mode including the rotor in horizontal mode HM or in vertical mode VM:

Rotor coupling mode A: rotor horizontal mode HM; rotor vertical mode VM.
Rotor coupling mode B: rotor horizontal mode HM; rotor vertical mode VM
Rotor coupling mode C: rotor horizontal mode HM; rotor vertical mode VM
Rotor coupling mode D: rotor horizontal mode HM; rotor vertical mode VM Rotor Coupling Mode A In Rotor Coupling Mode A, the rotor 600 is decoupled to the first propulsion unit 200 by disengagement via the first coupler 400, and is concurrently coupled to the second propulsion unit 300 via the second coupler 500.

With the rotor 600 in horizontal mode HM the second propulsion unit 300 can be used to drive the rotor 600 when the air vehicle is in aerodynamic flight mode, and for example provides low-noise operation, as compared with driving the rotor 600 using the first propulsion unit 200. Additionally or alternatively, this coupling mode can be used in emergency situations in which, for example, the first propulsion unit 200 fails or malfunctions and cannot generate any power, or there is a shortage of fuel to run the first propulsion unit, or it is otherwise deemed appropriate to decouple the first propulsion unit 200 from the rotor, and thus the second propulsion unit 300 is used as an emergency propulsion unit for aerodynamic flight.

Alternatively, with the rotor 600 in horizontal mode HM the second propulsion unit 300 can be used in windmill mode, in which the rotor 600 drives the second propulsion unit 300 when the air vehicle is in aerodynamic gliding flight mode, and the airstream over the rotor 600 turns the rotor 600. In this mode of operation, the second propulsion unit 300 operates as an electrical generator (the second propulsion unit 300 being configured for operating as an alternator as well as a motor), and this flight mode can be used for recharging the batteries of the air vehicle, for example.

With the rotor 600 in vertical mode VM the second propulsion unit 300 can be used to provide vertical thrust to the air vehicle for hover, VTO and/or VL operations. In addition, such vertical thrust is provided in low-noise operation, as compared with driving the rotor 600 using the first propulsion unit 200.

Rotor Coupling Mode B

In Rotor Coupling Mode B, the rotor 600 is coupled to the first propulsion unit 200 via the first coupler 400, and is concurrently decoupled from the second propulsion unit 300 by disengagement via the second coupler 500.

With the rotor 600 in horizontal mode HM the first propulsion unit 200 is used to drive the rotor 600 when the air vehicle is in aerodynamic flight mode, and enables efficient and long-range cruising and/or endurance.

With the rotor 600 in vertical mode VM the first propulsion unit 200 can be used as an emergency back-up propulsion unit to provide vertical thrust to the air vehicle for hover, VTO and/or VL operations, emergency situations in which, for example, the second propulsion unit 300 fails or malfunctions and cannot generate any power, or it is deemed appropriate to decouple the second propulsion unit 300 from the rotor during vectored thrust flight.

Rotor Coupling Mode C

In Rotor Coupling Mode C, the rotor 600 is coupled to the first propulsion unit 200 via the first coupler 400, and is concurrently coupled to the second propulsion unit 300 via the second coupler 500.

With the rotor 600 in horizontal mode HM the first propulsion unit 200 and the second propulsion unit 300 are both used to drive the rotor 600 when the air vehicle is in aerodynamic flight mode, and provides additional thrust than is required for cruising, for example. This coupling mode can be used for a variety of situations in which additional thrust can be required, for example: high air vehicle weight during conventional lift off or landing; greater altitude and/or airspeed than is possible using only one of the first propulsion unit 200 and the second propulsion unit 300.

Alternatively, with the rotor 600 in horizontal mode HM the first propulsion unit 200 is used to drive the rotor 600, and the rotor 600 is in turn used to drive the second propulsion unit 300, which is instead used for generating electrical power, when the air vehicle is in aerodynamic flight mode.

With the rotor 600 in vertical mode VM the first propulsion unit 200 and the second propulsion unit 300 are both used to drive the rotor 600 when the air vehicle is in vectored flight mode, and provides additional thrust than is required for hovering, VTO and/or VL operations, for example. This coupling mode can be used for a variety of situations in which additional vertical thrust may be required, for example: high air vehicle weight (or operating at high altitude) during VTO, VL or hovering than is possible using only one of the first propulsion unit 200 and the second propulsion unit 300.

Rotor Coupling Mode D

In Rotor Coupling Mode D, the rotor 600 is decoupled from the first propulsion unit 200 by disengagement via the first coupler 400, and is concurrently decoupled from the second propulsion unit 300 by disengagement via the second coupler 500.

With the rotor 600 in horizontal mode HM or in vertical mode VL, no thrust is generated by the rotor 600. This coupling mode can be used in extreme situations in which for example the rotor is damaged and if coupled to the first propulsion unit 200 and/or the second propulsion unit 300 could also damage the same as well. For example, other propulsion units in the air vehicle can be used to effect an emergency landing, and/or parachutes or other devices can be used for this purpose.

Figure 4A:
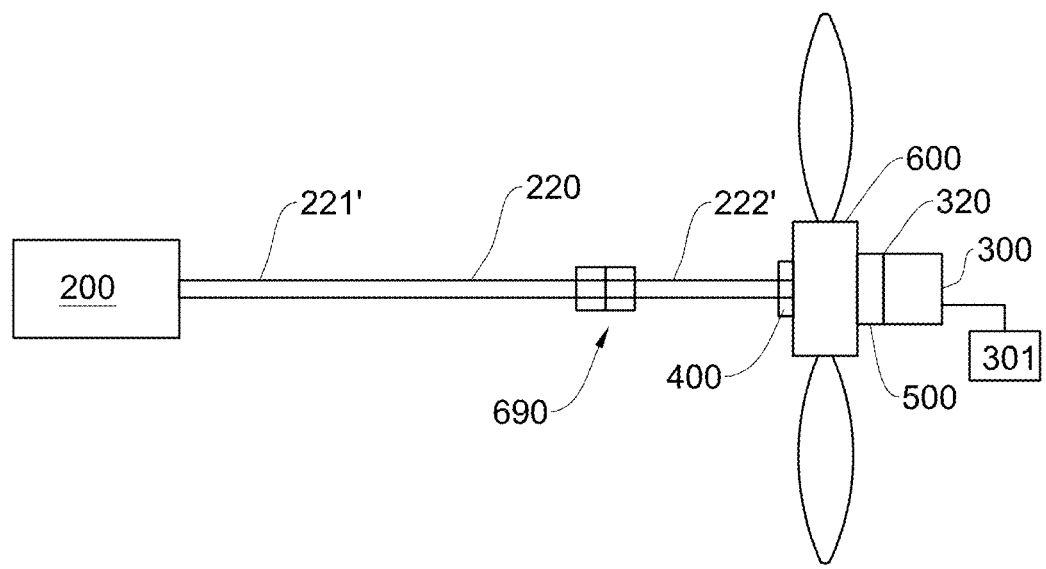
FIG. 4(a) schematically illustrates a propulsion system according to a second example of the presently disclosed subject matter, with the rotor in horizontal mode.
Figure 4B:
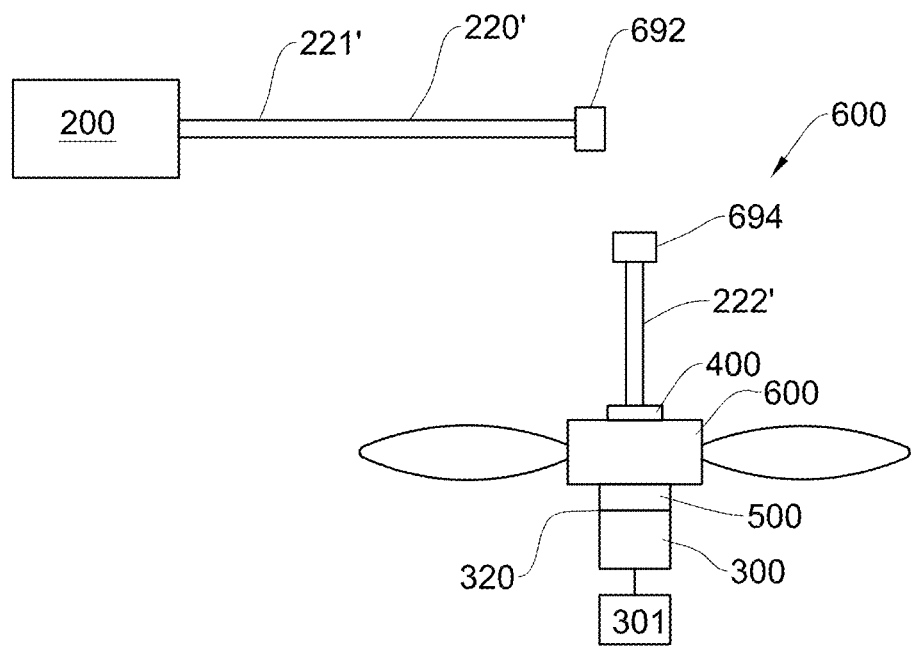
FIG. 4(b) shows the example of FIG. 4(a) with the rotor in vertical mode.

Referring to FIGS. 4(a) and 4(b), a second example of the propulsion system, generally designated 100', comprises the elements and feature of the first example and/or alternative variations thereof, with the following differences, mutatis mutandis. Thus, propulsion system 100' also comprises a first propulsion unit 200, a second propulsion unit 300, a first coupling 400, a second coupling 500, and a rotor 600, as disclosed for the first example, mutatis mutandis.

As with the first example, in the second example a first driveshaft 220' is provided for turning the rotor 600 when engaged thereto via the first coupling 400. Thus, the first propulsion unit 200 is reversibly coupled to the rotor 600 via the first driveshaft 220 and first coupler 400. However, in contrast to the first example, the first propulsion unit 200 is reversibly coupled to the rotor 600 via the first driveshaft 220' and first coupler 400 when the rotor 600 is in horizontal mode HM, but the first propulsion unit 200 is disengaged from the rotor 600 in vertical mode VM, irrespective of operation of the first coupler 400.

On the other hand, and as with the first example, in the second example the second driveshaft 320 directly turns the rotor 600 when engaged thereto via the second coupling 500. Thus, the second propulsion unit 300 is reversibly coupled to the rotor 600 via the second driveshaft 320 and second coupler 500. In the second example, the second coupler 500 is also axially located between the rotor 600 and the second propulsion unit 300.

Referring in particular to FIGS. 4(a) and 4(b), the first driveshaft 220' comprises a propulsion unit end portion 221' connected to and driven by the first propulsion unit 200, a rotor end portion 222' connected to and for driving the rotor 600, and a connector arrangement 690. The connector arrangement 690 is configured for automatically connecting the propulsion unit end portion 221' with respect to the rotor end portion 222' when the rotor 600 is in horizontal mode HM, and for automatically disconnecting the propulsion unit end portion 221' from the rotor end portion 222' when the rotor 600 is in vertical mode VM. The connector arrangement 690 comprises a first connector portion 692 provided at the aft end of the propulsion unit end portion 221', and a second connector portion provided at the forward end of the rotor end portion 222'.

Figure 5A:
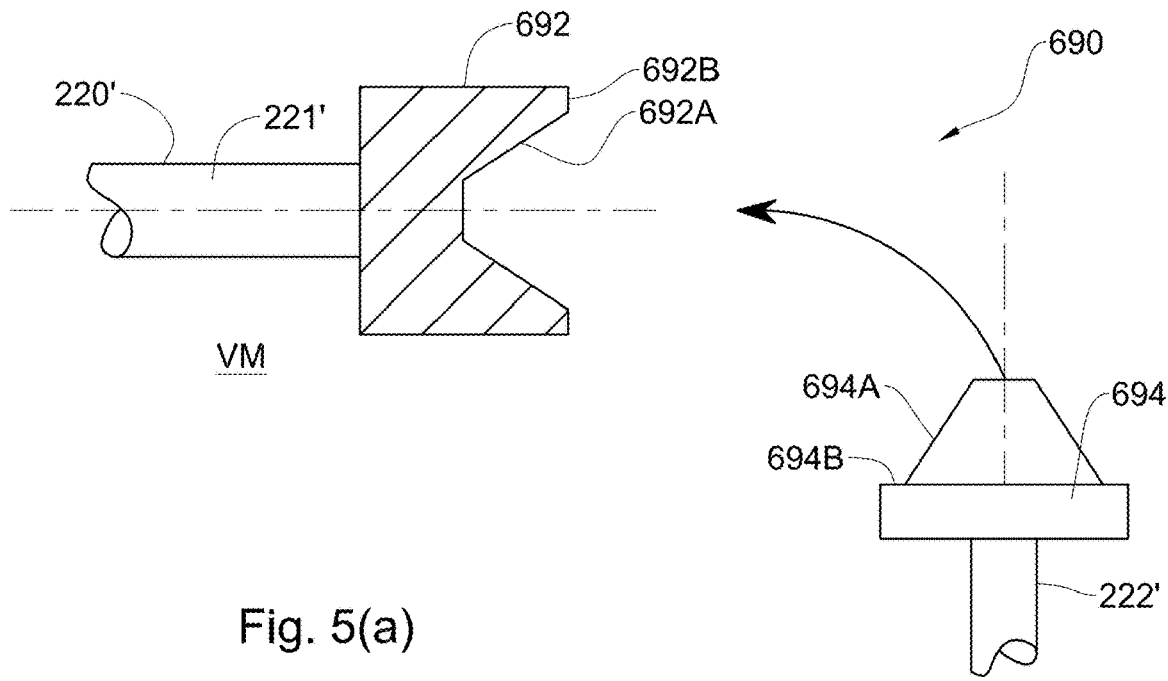
FIG. 5(a) illustrates in partially fragmented side view an example of the connecter of the example of FIGS. 4(a) and 4(b), with the rotor in vertical mode.
Figure 5B:
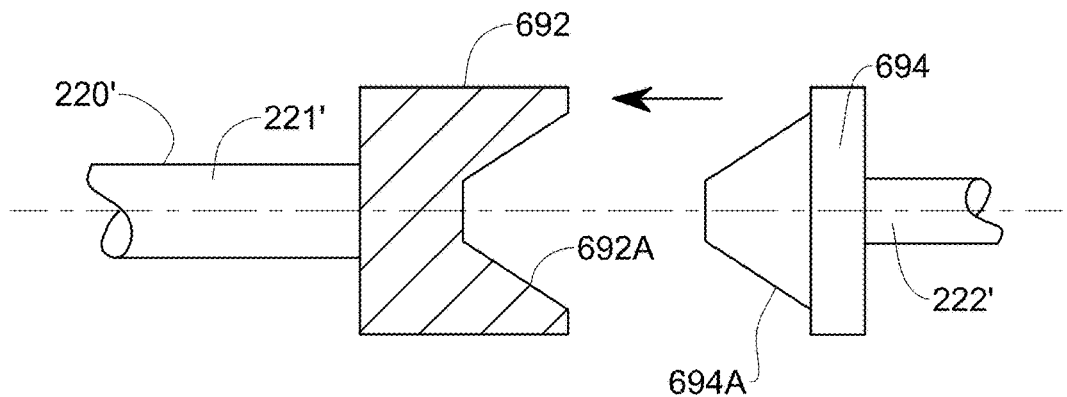
FIG. 5(b) shows in partially fragmented side view the example of FIG. 5(a) with the rotor in horizontal mode prior to connection.
Figure 5C:
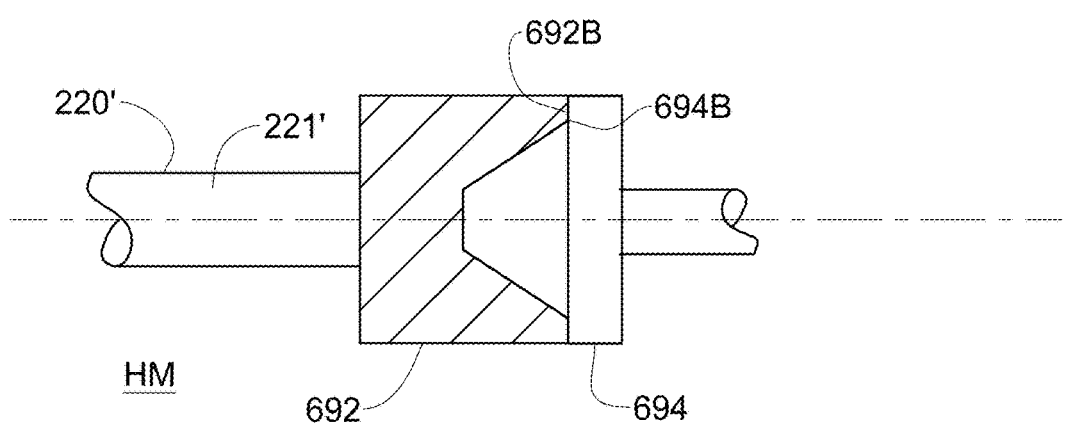
FIG. 5(c) shows in partially fragmented side view the example of FIG. 5(b) with the rotor in horizontal mode subsequent to connection.

An example of the connector arrangement 690 is illustrated in FIGS. 5(a), 5(b), 5(c). In this example, the first connector portion 692 comprises a female clutch portion 692A and a first dog-clutch portion 692B concentric therewith. The second connector portion 694 comprises a cone-shaped male clutch portion 694A and a second dog-clutch portion 694B concentric therewith. The female clutch portion 692A is in the form of a cone-shaped cavity complementary to the male clutch portion 694A. When pivoting the rotor 600 from vertical mode VM (FIG. 5(a)) to horizontal mode HM (FIG. 5(c)), the propulsion system 100' is configured for first providing a rotation about the pivot axis PA followed by a linear displacement. This combination of pivoting and linear movement can be provided, for example, by suitably contouring the slots 670 to include a linear portion as well as a curvuate portion.

The rotation about the pivot axis PA provides the second angular disposition α2, in which the propulsion unit end portion 221' is co-axial to the rotor end portion 222', but the first connector portion 692 is axially spaced from the second connector portion 694 (FIG. 5(b)). Once axially aligned, there follows a linear displacement in which the male clutch portion 694A enters the female clutch portion 692A; concurrently, the rotor 600 is being turned by second propulsion unit 300. In this example, the first coupler 400 is provided in the propulsion unit end portion 221' and initially decouples the female clutch portion 692A from the first propulsion unit 200 this allows the rotation of the female clutch portion 692A to be synchronized with the rotation of the male clutch portion 694A via the frictional frusto-conical facing surfaces of the clutch portions, and once synchronized the first dog-clutch portion 692B meshes with the second dog-clutch portion 694B to lock the first connector portion 692 with the second connector portion 694 in rotation. Thereafter the first coupler 400 can couple the rotor with the first propulsion unit 200 whenever desired to allow the first propulsion unit 200 to power the rotor 600. Operation of the propulsion system 100' from the horizontal mode HM to the vertical mode VM is the inverse of the above.

In alternative variations of this example, wherein the coupler 400 is provided in the rotor end portion 222', between the rotor 600 and the and initially decouples the female clutch portion 692A from the first propulsion unit 200 this allows the rotation of the female clutch portion 692A to be synchronized with the rotation of the male clutch portion 694A and the second connector portion 694, the first coupler 400 is also decoupled until the first connector portion 692 and the second connector portion 694 are fully engaged.

While in the second example, the first coupling 400 is located in the rotor end portion 222', in alternative variations of this example the first coupling 400 can be located in the propulsion unit end portion 221'.

The propulsion system 100' also has a number of operations modes, including at least the following rotor coupling modes, each mode including the rotor in horizontal mode HM or in vertical mode VM, in a similar manner as disclosed above for the first example, mutatis mutandis:

Rotor coupling mode A': rotor horizontal mode HM; rotor vertical mode VM.

Rotor coupling mode B': rotor horizontal mode HM; rotor vertical mode VM

Rotor coupling mode C': rotor horizontal mode HM; rotor vertical mode VM

Rotor coupling mode D': rotor horizontal mode HM; rotor vertical mode VM

Rotor Coupling Mode A'

In Rotor Coupling Mode A' (corresponding to Rotor Coupling Mode A for the first example), the rotor 600 is decoupled to the first propulsion unit 200 by disengagement via the first coupler 400, and is concurrently coupled to the second propulsion unit 300 via the second coupler 500, and the propulsion system 100' operates in a similar manner to that disclosed for the first example for Rotor Coupling Mode A, both in vertical mode VM and in horizontal mode HM, mutatis mutandis.

Rotor Coupling Mode B'

In Rotor Coupling Mode B' (corresponding to Rotor Coupling Mode B for the first example), the rotor 600 is coupled to the first propulsion unit 200 via the first coupler 400, and is concurrently decoupled from the second propulsion unit 300 by disengagement via the second coupler 500, and the propulsion system 100' operates in a similar manner to that disclosed for the first example for Rotor Coupling Mode B in horizontal mode HM, mutatis mutandis.

On the other hand, the propulsion system 100' cannot operate in Rotor Coupling Mode B' with the rotor 600 in vertical mode VM, because in the vertical mode VM the rotor 600 is automatically disconnected from the first propulsion unit 200. Thus operation Rotor Coupling Mode B' with the rotor 600 in vertical mode VM is similar to operation in Rotor Coupling Mode D' with the rotor 600 in vertical mode VM (see below).

Rotor Coupling Mode C'

In Rotor Coupling Mode C' (corresponding to Rotor Coupling Mode C for the first example), the rotor 600 is coupled to the first propulsion unit 200 via the first coupler 400, and is concurrently coupled to the second propulsion unit 300 via the second coupler 500, and the propulsion system 100' operates in a similar manner to that disclosed for the first example for Rotor Coupling Mode C in horizontal mode HM, mutatis mutandis.

On the other hand, the propulsion system 100' cannot operate in Rotor Coupling Mode C' with the rotor 600 in vertical mode VM, because in the vertical mode VM the rotor 600 is automatically disconnected from the first propulsion unit 200. Thus, operation of Rotor Coupling Mode C' with the rotor 600 in vertical mode VM is similar to operation in Rotor Coupling Mode A' with the rotor 600 in vertical mode VM (see above).

Rotor Coupling Mode D'

In Rotor Coupling Mode D' (corresponding to Rotor Coupling Mode D for the first example), the rotor 600 is decoupled from the first propulsion unit 200 by disengagement via the first coupler 400, and is concurrently decoupled from the second propulsion unit 300 by disengagement via the second coupler 500, and the propulsion system 100' operates in a similar manner to that disclosed for the first example for Rotor Coupling Mode D both in vertical mode VM and in horizontal mode HM, mutatis mutandis.

Figure 6A:
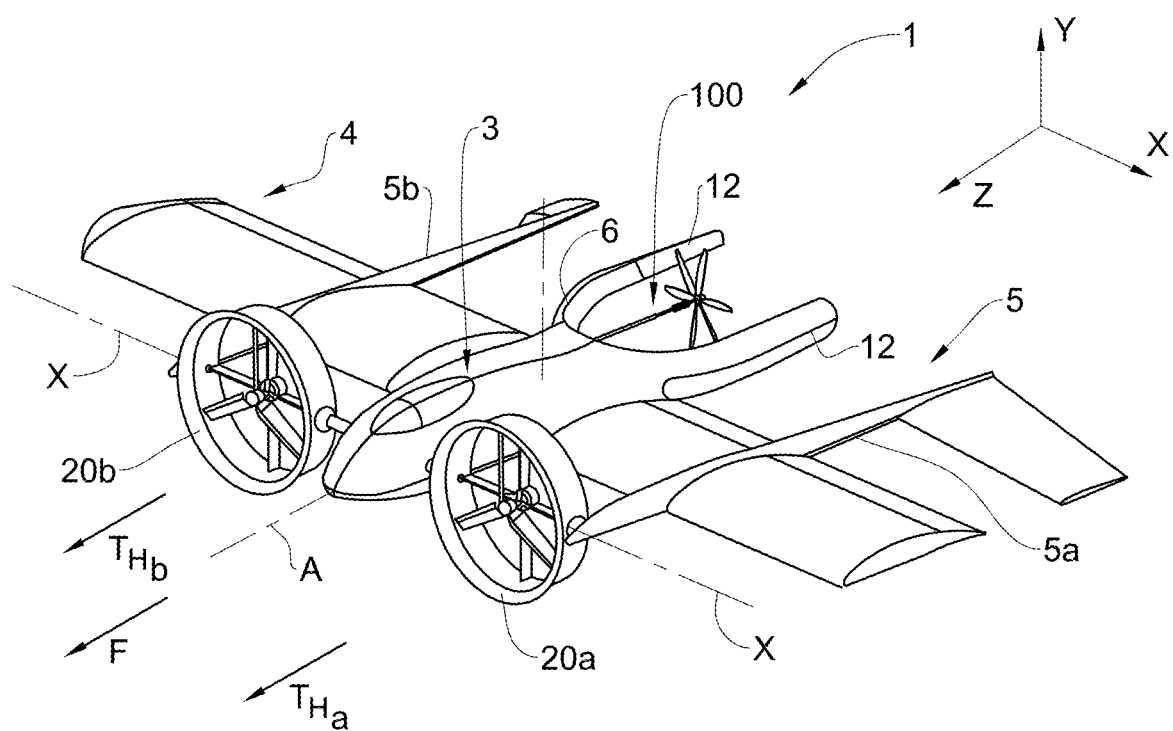
FIG. 6(a) is a front/top/side isometric view of an air vehicle of according to an example of the presently disclosed subject matter, with the rotor in horizontal mode and the air vehicle in aerodynamic flight mode.
Figure 6B:
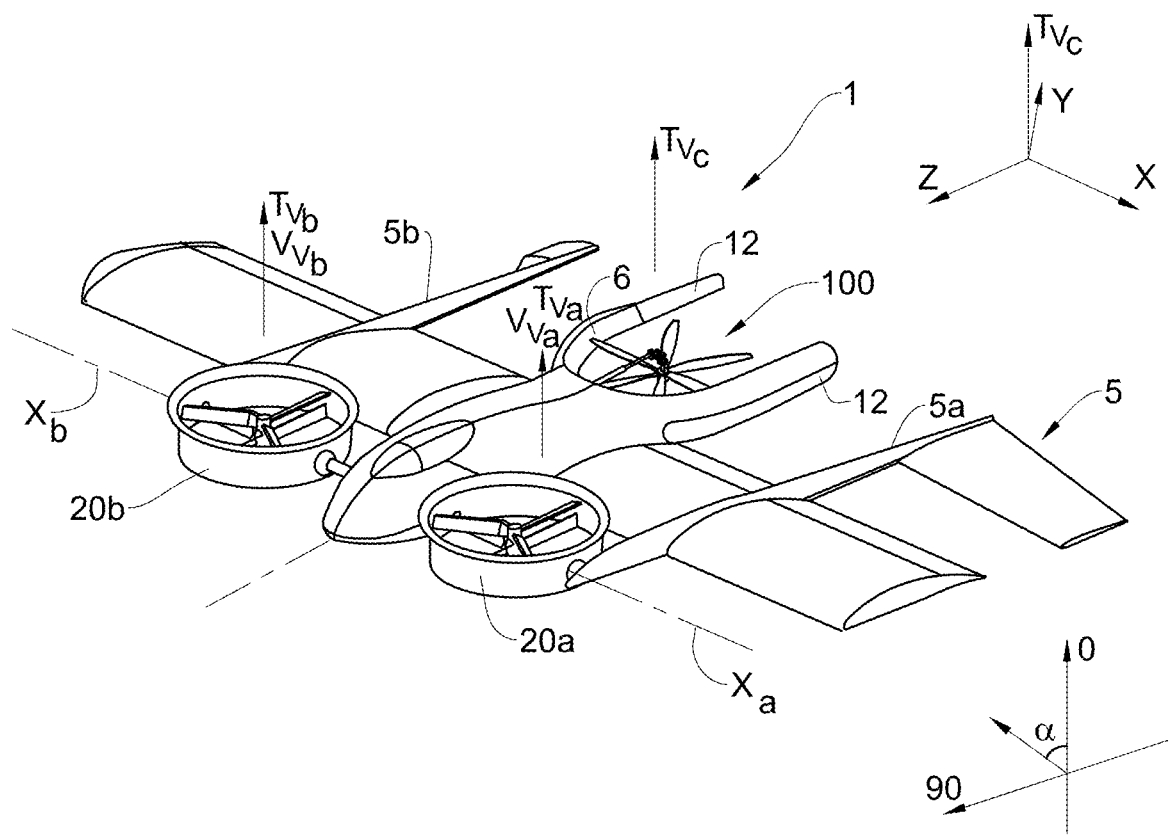
FIG. 6(b) is a front/top/side isometric view of the example of FIG. 6(a), with the rotor in vertical mode and the air vehicle in vectored thrust flight mode.

Referring to FIGS. 6(*a*) and 6(*b*), the air vehicle 1 according to an example of the presently disclosed subject matter, comprises airframe 2 including a main body in the form of fuselage 3, a wing arrangement 4, propulsion system 100 and an empennage 5.

In this example the air vehicle 1 also comprises a suitable undercarriage such as a tricycle undercarriage (not shown), which may be fixed or retractable. In alternative variations of this example, the air vehicle may be provided without an undercarriage and comprises an alternative arrangement for cushioning a landing or is configured for landing onto a suitable cradle or soft cushioning material in VTOL configuration. In alternative variations of this example, the air vehicle may be provided with a different undercarriage arrangement.

The air vehicle 1 has a roll axis z aligned with the longitudinal axis A of the body or fuselage 3 and the direction of forward flight F, pitch axis x, and yaw axis y.

The air vehicle 1 in this example is configured as a subsonic manned air vehicle, though in alternative variations of this example the air vehicle can be an unmanned air vehicle (UAV), and/or configured as a transonic and/or supersonic air vehicle.

The fuselage 3 comprises a nose and an aft end 6, and longitudinal axis A is generally parallel to the direction of forward flight F. The fuselage 3 comprises a generally oblate cross-sectional area taken along transverse planes generally orthogonal to the direction of forward flight F. Twin booms 12 extend from the aft end of the fuselage 3.

Wing arrangement 4 is a fixed wing arrangement, comprising a port wing and a starboard wing, and thus, the port wing and the starboard wing are fixedly connected to the fuselage in a fixed geometrical relationship, at least in aerodynamic flight. It is to be noted that in alternative variations of this example, the port wing and the starboard wing can be pivotably mounted to the fuselage to controllably change the sweep angle of the wings and optimize performance both in the low velocity and high velocity aerodynamic flight regimes (so-called variable geometry wings). In these or other alternative variations of this example, the wings and fuselage may be in the form of a blended wing body (BWB) configuration.

In this example, empennage 5 comprises a pair of laterally spaced empennage booms each having a fin, a port empennage boom 5*a* connected to the port wing, and a starboard empennage boom 5*b* connected to the starboard wing. Each empennage boom projects in an aft direction from the respective wing. Each fin comprises a control surface at the trailing edge thereof that operates both as a rudder and as a vertical stabilizer in the aerodynamic flight regime of the air vehicle. In alternative variations of this example, any suitable alternative configuration for empennage 5 may be provided, taking into account the structure and function of the propulsion system 100.

The air vehicle 1 further comprises a pair of forward-mounted vectored thrust propulsion units, in the form of vectored ducted fan units 20*a*, 20*b*, in addition to the single, aft-mounted, propulsion system 100, in triangular spatial arrangement in plain-view. The triangular spatial arrangement encloses the center of gravity of the air vehicle in plan view. In alternative variations of this example, the propulsion system 100 can be provided at the front of the air vehicle, or at least forward of the center of gravity CG, and a pair of vectored thrust propulsion units is provided at the aft end, or at least aft of the center of gravity CG of the air vehicle.

The air vehicle 1 further comprises a suitable control system (not shown) for operating the propulsion system 100 and ducted fan units 20*a*, 20*b*, in particular the magnitudes of each of the thrusts $T_a$, $T_b$, $T_c$ generated by ducted fan units 20*a*, 20*b*, and the propulsion system 100, respectively, independently of one another, and the thrust vectors $V_a$ $V_b$ and $V_c$ of the ducted fan units 20*a*, 20*b*, and propulsion system 100, respectively, independently of one another.

In this example, the ducted fan unit 20*a*, 20*b* each comprises an electric motor for driving the respective fan(s), and each ducted fan unit 20*a*, 20*b* can have the same power rating as the second propulsion unit 300, for example.

The forward ducted fan units 20*a*, 20*b* are rotatably mounted with respect to the fuselage, to enable the ducted fan units 20*a*, 20*b* to be reversibly tilted about axis $X_a$ with respect to the fuselage 3 about any desired tilt angle α, at least between a tilt angle α of zero degrees and 90 degrees. Tilt angle α of zero degrees corresponds to the general vertical thrust position shown in FIG. 6(*b*) in which the thrust vector $V_{Va}$ is substantially parallel to the yaw axis y. Tilt angle α of 90 degrees corresponds to the general longitudinal thrust position shown in FIG. 6(*a*) in which the thrust vector $V_{Ha}$ is substantially parallel to the roll axis z and points in direction F. Axis $X_a$ is substantially parallel to the pitch axis x of the air vehicle 1.

A suitable drive mechanism (not shown) is provided for independently and controllably driving the tilting of each of the two forward ducted fan units 20*a* and 20*b* to controllably vary the respective thrust vector, i.e., the angular position of the respective thrust generated by the respective propulsion unit, independently of one another. The drive mechanism is configured for tilting the ducted fan units 20*a* and 20*b* in a relatively fast manner, and provide very quick and accurate response to tilting commands (in terms of direction and angular displacement) provided by the control system.

In at least this example, the tilt axes $X_a$, $X_b$ are coaxially aligned.

In alternative variations of this example, the tilt axes $X_a$, $X_b$ may be each set at a modest angle to the pitch axis x and/or yaw axis y and/or roll axis z so as to provide a desired thrust vector component along one or more of the roll, pitch or yaw axes, respectively. For example, it may be desired to have the thrust vectors $V_a$ and $V_b$ in the vertical thrust position in a mutually converging or diverging relationship when viewed from the front of the air vehicle. Converging thrust vectors may delay the formation of an upwash fountain between the front propulsion units, while diverging thrust vectors may provide natural stability in roll during landing and take-off, for example.

The air vehicle 1 is configured for controllably, selectively and independently varying the thrust vectors $V_a$ and $V_b$ by the changing the respective tilt angles α independently from one another. This feature provides at least differential and selective tilt control for the thrust vectors generated by each one of the forward ducted fan units 20*a*, 20*b*, independently of the other forward ducted fan unit. Nevertheless, the forward ducted fan units 20*a*, 20*b* can also be operated to tilt together in the same direction and through the same or different angular displacement one from the other. Furthermore, the air vehicle 1 is configured for controllably and selectively changing the magnitude of the thrust $T_a$, $T_b$, $T_c$ generated by each of the ducted fan units 20*a*, 20*b*, and the propulsion system 100, respectively, independently of one another. The air vehicle 1 is also configured for controllably and selectively changing the magnitude of the thrust $T_a$, $T_b$, generated by each of the forward ducted fan units 20*a*, 20*b*, respectively, independently of one another, and also independently of the magnitude of the respective tilt angles α thereof, i.e., of the thrust vectors $V_a$ and $V_b$, which may also be controllably and selectively varied independently one from the other.

The air vehicle 1 may be operated at least in an aerodynamic flight regime, and in a vectored thrust flight regime, for example as follows. The air vehicle 1 is also configured for performing transition between aerodynamic flight mode and vectored thrust mode.

Aerodynamic Flight Mode

In the aerodynamic flight regime, the air vehicle 1 can be operated exclusively in aerodynamic flight mode (also referred to herein as "aerodynamic flight"), in which the air vehicle has sufficient forward velocity to enable sufficient aerodynamic lift to be generated by the air vehicle, in this example by the wings 4, and for pitch roll and yaw control to be provided via the air vehicle control surfaces. The two forward mounted ducted fan units 20*a*, 20*b* are in nominal horizontal or longitudinal mode, with the respective tilt angles α nominally set at 90 degrees, to provide thrust vectors $V_{Ha}$ and $V_{Hb}$, respectively in the general forward flight direction F, and thrusts $T_a$ and $T_b$ are nominally equal. Concurrently, the rotor 600 is in horizontal mode HM, and the propulsion system 100 can be used in any desired coupling mode, including one or more of Rotor Coupling Modes A, B, C or D, as disclosed above mutatis mutandis, as appropriate.

In this flight mode, the air vehicle 1 can operate within its flight envelope in a similar manner to that of conventional fixed-wing aircraft.

For example, in aerodynamic flight—and depending on the speed required—the air vehicle 1 can require on average between 200 kW and 400 kW, for an air vehicle in the weight range of between 3 tonne and 4 tonnes.

Vectored Thrust Flight Mode

In the vectored thrust flight regime, the air vehicle 1 may be operated exclusively in vectored thrust flight mode (also referred to herein as "vectored thrust flight", or as "VTOL operations"), in which at least all the lift (and optionally also movement and control) of the air vehicle are provided by the propulsion system 100 and ducted fan units 20*a*, 20*b*, under the control of the control system.

For VTOL operations, the forward ducted fan units 20*a*, 20*b* are tilted to the nominal vertical position, in which tilt angles α are set at nominally zero degrees, and ducted fan units 20*a*, 20*b* and the propulsion system 100 provide vertical thrust. Concurrently, the rotor 600 is in vertical mode VM, and the propulsion system 100 can be used in any desired coupling mode, including Rotor Coupling Modes A, B, C or D, as disclosed above mutatis mutandis, as appropriate.

In the illustrated example, the center of gravity CG of the air vehicle is located generally centrally with respect to the ducted fan units 20*a*, 20*b* and the propulsion system 100, and thus the ducted fan units 20*a*, 20*b* and the propulsion system 100 each generate nominally the same thrust levels.

In at least one implementation of the air vehicle 1, each of the ducted fan units 20*a*, 20*b* and the second propulsion unit of the propulsion system 100 each comprises an electrically powered motor rated at about 500 kW, while the second propulsion unit of the propulsion system 100 comprises an internal combustion engine rated at 500 HP to about 600 HP, which together provide a total power rating of about 2,000 kW or 2,600 HP for the air vehicle 1, which can have a weight in the 3 tonne to 3.5 tonne range, for example.

For example, in hover (including VTO, vertical climbing, VL and vertical descent) the air vehicle 1 can require on average about 1,300 kW to be provided by the ducted fan units 20*a*, 20*b* and propulsion system 100, for an air vehicle in the weight range of between 3 tonne and 4 tonnes.

In alternative variations of this example, where the center of gravity is located closer to or further away from propulsion system 100 than with respect to the forward ducted fan units 20*a*, 20*b*, and the ratio of the thrust provided by the propulsion system 100 relative to the forward ducted fan units 20*a*, 20*b* is correspondingly such as to provide pitch balance to the air vehicle. The relative thrust split between the propulsion system 100 relative to the forward ducted fan units 20a, 20b can also be controlled to offset a longitudinal shift in the position of the CG, for example related to the location, size or absence of the payload. Additionally or alternatively, the relative thrust split between the two forward ducted fan units 20a, 20b can also be controlled to offset a lateral shift in the position of the CG that is for example inherent in the air vehicle design or that is related to the location, size or absence of the payload—for example where a stores on one wing is jettisoned while retaining a similar stores on the other wing.

In alternative variations of the above examples, the ducted fan units 20a, 20b, can be replaced with any other suitable vectored thrust propulsion unit configurations, for example pivotable unducted fans, pivotable propellers, etc.

In another example of the air vehicle 1, the propulsion unit 100 is replaced with propulsion unit 100' and thus operates in a similar manner to that disclosed above for air vehicle 1 in aerodynamic flight mode and in vectored thrust flight mode, mutatis mutandis, with the main difference that correspondingly the propulsion unit 100' operates in its corresponding coupling mode, including Rotor Coupling Modes A', B', C' or D', as disclosed above mutatis mutandis, as appropriate.

Thus, in the above examples, the propulsion system 100 or the propulsion system 100' each operates as a hybrid propulsion system at times driven by fuel energy and electrical energy, at other times by fuel energy only, and at other times by electrical energy only.

Figure 7A:
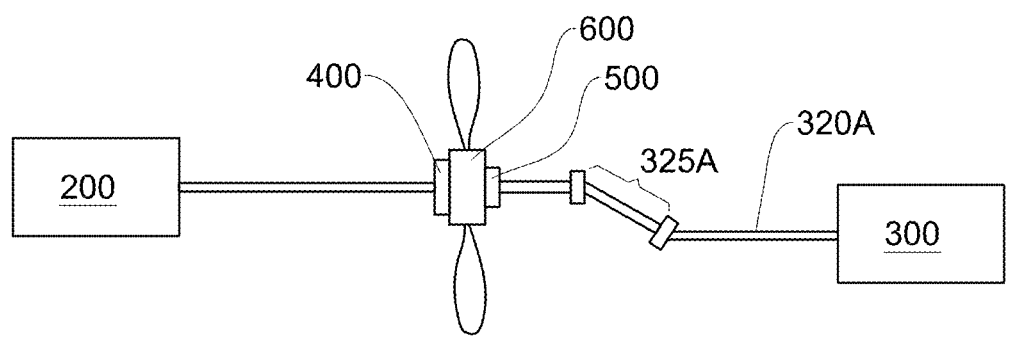
FIG. 7(a) schematically illustrates a propulsion system according to an alternative variation of the examples of FIGS. 1(a) to 4(b), with the rotor in horizontal mode.
Figure 7B:
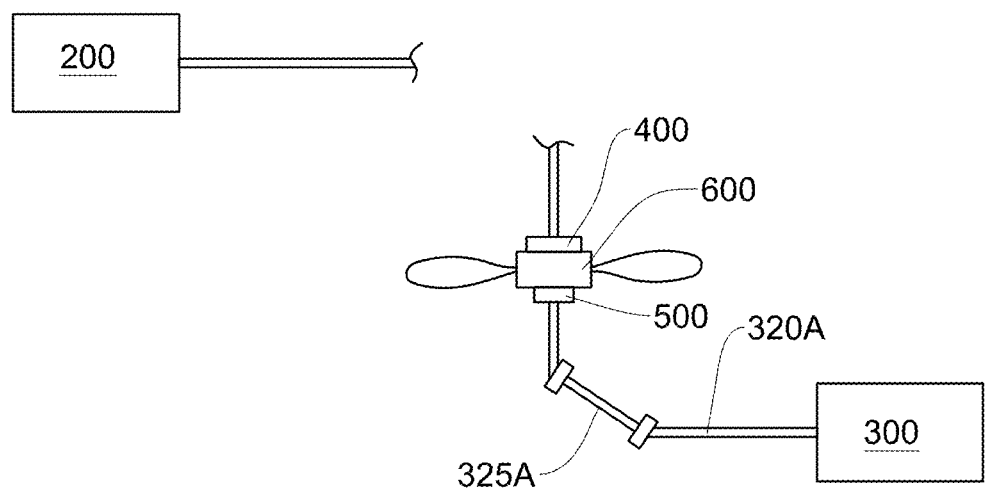
FIG. 7(b) shows the example of FIG. 7(a) with the rotor in vertical mode.

In the above examples, the propulsion system 100 or the propulsion system 100' each operates to pivot the respective rotor between vertical mode VM and horizontal mode HM while the second propulsion unit 300 is connected thereto, and thus the second propulsion unit 300 concurrently pivots with the rotor between vertical mode VM and horizontal mode HM. However, in alternative variations of these examples, the second propulsion unit 300 does not pivot with the rotor when the rotor pivots between vertical mode VM and horizontal mode HM. For example, referring to FIGS. 7(a) and 7(b), the second propulsion unit 300 is fixedly mounted to the airframe in a similar manner to the first propulsion unit 200, but the respective second driveshaft 320A comprises a universal joint arrangement 325A that enables the second propulsion unit 200 to be driven by or to drive the rotor 600, both in vertical mode VM, horizontal mode HM and in transition therebetween. Thus, in the examples illustrated in FIGS. 7(a) and 7(b), only the rotor 600 pivots between vertical mode VM and horizontal mode HM.

While in the above examples, the propulsion system 100 or the propulsion system 100' each has the second propulsion unit 300 on the opposed longitudinal side of the rotor with respect to the first propulsion unit 200, in alternative variations of these examples, both the first propulsion unit 200 and the second propulsion unit 300 can be on the same longitudinal side of the rotor.

While in the above examples the air vehicle has a single propulsion system 100 or 100', in alternative variations of these examples, the air vehicle can have two or more propulsion system 100 or 100', and optionally no additional vectored thrust propulsion units, or one or more than one additional vectored thrust propulsion units.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A propulsion system comprising:
    a first propulsion unit configured for being fixedly mounted to an airframe of an air vehicle;
    a second propulsion unit;
    a rotor having a hub and a rotational axis, the rotor being configured for being pivotably mounted with respect to the first propulsion unit to allow selectively pivoting of the rotor about a pivot axis from a horizontal mode to a vertical mode;
    the rotor having a first longitudinal side and an opposed-facing second longitudinal side along said rotational axis;
    a first coupling for selectively coupling and decoupling the rotor with respect to the first propulsion unit;
    a second coupling for selectively coupling and decoupling the rotor with respect to the second propulsion unit, independently of the first coupling;
    wherein said first propulsion unit is reversibly coupled to the first longitudinal side of the rotor, and wherein said second propulsion unit is reversibly coupled to the second longitudinal side of the rotor,
    such that, in said horizontal mode, the first propulsion unit is reversibly coupled to the first side of the rotor facing forward in use, while the second propulsion unit is reversibly coupled to the second side of the rotor facing aft in use;
    wherein the first propulsion unit is reversibly coupled to the rotor via a first driveshaft;
    wherein said first driveshaft comprises a first portion driven by the first propulsion unit and a second portion for driving the rotor when the first driveshaft is coupled to the rotor via the first coupling;
    wherein said second portion is operatively connected to said hub;
    wherein said first portion and said second portion pivot with respect to one another about said pivot axis between a first angular disposition angle located between said first portion and said second portion and a second angular disposition angle located between said first portion and said second portion;
    wherein said first portion comprises a first portion axis and wherein said second portion comprises a second portion axis;
    wherein said first portion axis and said second portion axis are coplanar in both said first angular disposition angle and said second angular disposition angle;
    wherein said second propulsion unit is configured to pivot together with said rotor; and
    wherein the rotor is constrained for enabling said pivoting only about said pivot axis, and wherein said pivot axis is parallel to a pitch axis of the air vehicle when the propulsion system is installed in the air vehicle.

2. The propulsion system according to claim 1, including at least one of:
    wherein said first propulsion unit comprises an internal combustion engine;
    wherein said second propulsion unit comprises an electric motor.

3. The propulsion system according to claim 1, wherein said rotor comprises any one of: one or more propellers; one or more ducted fans; one or more unducted fans.

4. The propulsion system according to claim 1, including at least one of:
   wherein said first propulsion unit has a first power rating and wherein said second propulsion unit has a second power rating;
   wherein said first propulsion unit has a first power rating and wherein said second propulsion unit has a second power rating, and wherein said first power rating is within ±10% of said second power rating;
   wherein said first propulsion unit has a first power rating and wherein said second propulsion unit has a second power rating, and wherein a power rating ratio between said first power rating and said second power rating is between 0.1 and 10;
   wherein said first propulsion unit has a first power rating and wherein said second propulsion unit has a second power rating, and, wherein said power rating ratio is 1.0.

5. The propulsion system according to claim 1, wherein in said vertical mode said first portion is at said first angular disposition angle with respect to said second portion, and wherein in said horizontal mode said first portion is at said second angular disposition angle with respect to said second portion.

6. The propulsion system according to claim 5, wherein said first angular disposition angle located between said first portion and said second portion of said first driveshaft is about 180° in pitch, and wherein said second angular disposition angle located between said first portion and second portion of said first drive shaft is about 90° in pitch.

7. The propulsion system according to claim 1, including at least one of:
   wherein said first driveshaft comprises a universal joint arrangement to allow said first portion and said second portion to pivot between said first angular disposition angle and said second angular disposition angle while concurrently remaining operatively connected to one another to allow torque to be transmitted between said first portion and said second portion;
   wherein said first driveshaft comprises a universal joint arrangement to allow said first portion and said second portion to pivot between said first angular disposition angle and said second angular disposition angle while concurrently remaining operatively connected to one another to allow torque to be transmitted between said first portion and said second portion, and, further comprising a shroud member configured for covering the first driveshaft in any angular disposition angle between said first angular disposition and said second angular disposition angle;
   wherein said first driveshaft comprises a universal joint arrangement to allow said first portion and said second portion to pivot between said first angular disposition angle and said second angular disposition angle while concurrently remaining operatively connected to one another to allow torque to be transmitted between said first portion and said second portion, and, further comprising a shroud member configured for covering the first driveshaft in any angular disposition angle between said first angular disposition angle and said second angular disposition angle, and, wherein said shroud member comprises a rigid tubular first shroud portion for covering said first portion, a rigid tubular second shroud portion for covering said second portion, and a flexible tubular shroud joint portion for covering the universal joint arrangement, wherein the first shroud portion, the second shroud portion and said shroud joint portion are contiguous.

8. The propulsion system according to claim 1, including at least one of:
   wherein said first coupling comprises a first electrical clutch configured for selectively engaging and disengaging the first propulsion unit with respect to the rotor;
   wherein the second propulsion unit is reversibly coupled to the rotor via a second driveshaft;
   wherein said second coupling comprises a second electrical clutch configured for selectively engaging and disengaging the second propulsion unit with respect to the rotor;
   wherein the rotor is rotatably mounted to a support bracket, the support bracket being pivotable between the horizontal mode and the vertical mode.

9. The propulsion system according to claim 1, wherein said second propulsion unit is configured for selectively generating electrical power when driven by any one of:
   (a) said first propulsion unit;
   (b) said rotor, which is in wind milling mode and in turn is aerodynamically driven by an airflow.

10. The propulsion system according to claim 1, wherein said first angular disposition angle located between said first portion and said second portion of said first driveshaft is about 180 degrees when said rotor is in said horizontal mode, and said second angular disposition angle located between said first portion and said second portion of said first driveshaft is about 90 degrees when said rotor is in the vertical mode.

11. The propulsion system according to claim 1, further comprising a universal joint located between said first portion and said second portion of said first driveshaft, said universal joint configured to allow said first portion and said second portion to pivot between said first angular disposition angle and said second angular disposition angle while concurrently remaining operatively connected to one another to allow torque to be transmitted between said first portion and said second portion; and a pivotable support bracket pivotably connecting the second portion of said first driveshaft to said airframe so that said rotor and said support bracket concurrently pivot about the pivot axis to allow the rotor to rotate between said horizontal mode and said vertical mode.

12. The propulsion system according to claim 1, wherein the rotor is rotatably mounted to a support bracket, and wherein the support bracket is configured for concurrently pivoting with the rotor about the pivot axis.

13. An air vehicle comprising at least one propulsion system comprising:
   a first propulsion unit configured for being fixedly mounted to an airframe of the air vehicle;
   a second propulsion unit;
   a rotor having a hub and a rotational axis, the rotor being configured for being pivotably mounted with respect to the first propulsion unit to allow selectively pivoting of the rotor about a pivot axis from a horizontal mode to a vertical mode;
   the rotor having a first longitudinal side and an opposed-facing second longitudinal side along said rotational axis;
   a first coupling for selectively coupling and decoupling the rotor with respect to the first propulsion unit;
   a second coupling for selectively coupling and decoupling the rotor with respect to the second propulsion unit, independently of the first coupling;

wherein said first propulsion unit is reversibly coupled to the first longitudinal side of the rotor, and wherein said second propulsion unit is reversibly coupled to the second longitudinal side of the rotor, such that, in said horizontal mode, the first propulsion unit is reversibly coupled to the first side of the rotor facing forward in use, while the second propulsion unit is reversibly coupled to the second side of the rotor facing aft in use;

wherein the first propulsion unit is reversibly coupled to the rotor via a first driveshaft;

wherein said first driveshaft comprises a first portion driven by the first propulsion unit and a second portion for driving the rotor when the first driveshaft is coupled to the rotor via the first coupling;

wherein said second portion is operatively connected to said hub;

wherein said first portion and said second portion pivot with respect to one another about said pivot axis between a first angular disposition angle located between said first portion and said second portion and a second angular disposition angle located between said first portion and said second portion;

wherein said first portion comprises a first portion axis and wherein said second portion comprises a second portion axis;

wherein said first portion axis and said second portion axis are coplanar in both said first angular disposition angle and said second angular disposition angle;

wherein said second propulsion unit is configured to pivot together with said rotor; and wherein the rotor is constrained for enabling said pivoting only about said pivot axis, and wherein said pivot axis is parallel to a pitch axis of the air vehicle when the propulsion system is installed in the air vehicle.

14. The air vehicle according to claim 13, at least one of:
further comprising at least one battery operatively connected to the second propulsion unit;
one said propulsion system and two tiltable vectored thrust propulsion units tiltable at least between respective horizontal mode and vertical mode, wherein said propulsion system and said two vectored thrust propulsion units are in triangle configuration;
one said propulsion system and two tiltable vectored thrust propulsion units tiltable at least between respective horizontal mode and vertical mode, wherein said propulsion system and said two vectored thrust propulsion units are in triangle configuration, and, comprising one said propulsion system and two tiltable vectored thrust propulsion units tiltable at least between respective horizontal mode and vertical mode, wherein said propulsion system and said two vectored thrust propulsion units are in triangle configuration;
one said propulsion system and two tiltable vectored thrust propulsion units tiltable at least between respective horizontal mode and vertical mode, wherein said propulsion system and said two vectored thrust propulsion units are in triangle configuration, and, wherein said propulsion system is aft mounted along a longitudinal axis of the air vehicle, and said two vectored thrust propulsion units are forward mounted, each said vectored thrust propulsion unit laterally spaced from the longitudinal axis in opposed directions;
one said propulsion system and two tiltable vectored thrust propulsion units tiltable at least between respective horizontal mode and vertical mode, wherein said propulsion system and said two vectored thrust propulsion units are in triangle configuration, and, wherein said propulsion system is forward mounted along a longitudinal axis of the air vehicle, and said two vectored thrust propulsion units are aft mounted, each said vectored thrust propulsion unit laterally spaced from the longitudinal axis in opposed directions.

15. The air vehicle according to claim 13, wherein the air vehicle is configured as an unmanned air vehicle (UAV).

16. A method for operating an air vehicle, comprising:
providing the air vehicle as defined in claim 13;
operating the air vehicle in one or more of vertical configuration and horizontal configuration, wherein in vertical configuration said rotor is in vertical mode, and wherein in horizontal configuration said rotor is in horizontal mode.

17. The method according to claim 16, comprising setting said rotor in horizontal mode, decoupling said rotor from said first propulsion unit and coupling said rotor to said second propulsion unit.

18. The method according to claim 17, wherein the air vehicle is operated in one or more of:
enabling the second propulsion unit to exclusively provide propulsion for the air vehicle in aerodynamic flight;
enabling the air vehicle to cruise unpowered to provide silent gliding; and
enabling the air vehicle to cruise unpowered and using the airflow over the rotor to drive the second propulsion unit to thereby generate electrical power.

19. The method according to claim 16, comprising at least one of the following steps:
setting said rotor in vertical mode, decoupling said rotor from said first propulsion unit and coupling said rotor to said second propulsion unit;
setting said rotor in vertical mode, decoupling said rotor from said first propulsion unit and coupling said rotor to said second propulsion unit, and, for use in enabling the at least one propulsion unit to provide vertical propulsion exclusively from the second propulsion unit thereby providing low-noise VTOL operations;
comprising setting said rotor in horizontal mode, coupling said rotor to said first propulsion unit and decoupling said rotor to said second propulsion unit;
comprising setting said rotor in horizontal mode, coupling said rotor to said first propulsion unit and decoupling said rotor to said second propulsion unit, and, for use in enabling the first propulsion unit to exclusively provide propulsion for the air vehicle in aerodynamic flight;
comprising setting said rotor in vertical mode, coupling said rotor to said first propulsion unit and decoupling said rotor to said second propulsion unit;
comprising setting said rotor in vertical mode, coupling said rotor to said first propulsion unit and decoupling said rotor to said second propulsion unit, and, for use in enabling the at least one propulsion unit to provide vertical propulsion exclusively from the first propulsion unit thereby providing low-noise VTOL operations;
comprising setting said rotor in horizontal mode, coupling said rotor to said first propulsion unit and coupling said rotor to said second propulsion unit.

20. The method according to claim 16, comprising setting said rotor in horizontal mode, coupling said rotor to said first propulsion unit and coupling said rotor to said second propulsion unit, for use in one or more of:
- enabling the first propulsion unit and the second propulsion unit to provide augmented propulsion for the air vehicle in any one of: conventional take-off; conventional landing; aerodynamic flight;
- enabling the first propulsion unit to exclusively provide propulsion for the air vehicle and using the first propulsion unit to drive the second propulsion unit to thereby generate electrical power.

21. The method according to claim 20, including at least one of:
- comprising setting said rotor in vertical mode, coupling said rotor to said first propulsion unit and coupling said rotor to said second propulsion unit;
- comprising setting said rotor in vertical mode, coupling said rotor to said first propulsion unit and coupling said rotor to said second propulsion unit, and, for use in enabling the first propulsion unit and the second propulsion unit to provide augmented vertical propulsion for the air vehicle thereby providing augmented VTOL operations.

22. The air vehicle according to claim 13, wherein the air vehicle is configured as a manned air vehicle.

* * * * *